Patented Dec. 18, 1951

2,579,245

UNITED STATES PATENT OFFICE 2,579,245

PROCESS FOR PREPARING NUTS FOR BLANCHING

John Steiner, Chicago, Ill., assignor to The Kelling Nut Co., Chicago, Ill., a corporation of Illinois No Drawing. Application December 3, 1947,
Serial No. 789,551

6 Claims. (Cl. 146—227)

This invention is directed to an improved process for blanching nuts, such as peanuts, filberts, almonds, and the like.

The skins or nuts adhere tenaciously thereto. They contain moisture and have considerable tensile strength and are drawn tightly over the nut, and the skins, at least in the case of peanuts, appear to be held tightly at intervals in creased surfaces of the nuts. These factors all operate to make blanching or removal of the skins extremely difficult.

Present commercial processes for blanching nuts include treating the skins of the nuts to facilitate removal thereof and then mechanically removing the treated skins. The skin treating processes consist of drying and embrittling the skins or moistening and softening them, and the mechanical skin removal process employs a mechanical abrading apparatus for rubbing the treated skins from the nuts.

In the skin treating process wherein the skins are dried and embrittled, the nuts are heated in an oven by contact with hot air to a temperature of about 300° F. for a period of 40 to 60 minutes in order to remove sufficient moisture from the skins. At the end of the heating period, the nuts are removed from the oven and placed in curing trays where they remain for a period of 24 to 36 hours during which time their temperature slowly falls to that of the surrounding atmosphere. The skins are thus embrittled and rendered friable for the subsequent skin removal operation.

When the nuts are so thoroughly heated in an oven to dry their skins, and then are subjected to a slow cooling process, deleterious effects which may result include a reduction of moisture content, change of flavor, frequent browning of the nut meats, reduction of surface luster, and mottling of the nut surfaces. After being heated according to customary practice in ovens, nuts being prepared for blanching become warm throughout, and as a result they are slow in cooling. Roasting the whole nut, as is carried out in current pre-blanching operations, requires an extra expenditure of heat units, because the entire nut as well as the skin is heated to a drying temperature.

In the skin treating process wherein the skins are moistened and softened, the nuts are steamed for a relatively long period of time with steam at atmospheric pressure, or with steam under pressure, or with superheated steam for moistening and loosening the skins. The moist, soft and loose skins are then removed by mechanical blanching. Unless the moistening process is carefully controlled, a considerable amount of moisture is added to the nuts and may lead to an increased rate of rancidifying or may require additional roasting for its ultimate elimination.

The principal object of this invention is to provide an improved process for preparing nuts for blanching the same wherein the moisture content of the nuts is not materially altered, wherein the flavor is not unfavorably changed, wherein browning of the nut meats is eliminated, wherein mottling of the nut surfaces is prevented, wherein the surface luster of the nuts is not materially reduced, wherein the heat unit requirement is reduced to a minimum, and wherein the processing time is materially reduced.

In carrying out this object of the invention, the skins of the nuts are first softened and shrivelled by short exposure to steam, the amount of steaming being considerably less than that required for maximum loosening of the skin. The mild steaming leaves a thin film of moisture upon the nut skins without increasing to a marked degree the moisture content of the nut meats. Slightly moistened skins shrivel visibly, and if tumbled, some of the skins may tear or rub off.

While the skins of the nuts are still warm and moist, the skins of the lightly steamed nuts are promptly and rapidly dried. Two methods of rapidly drying the nut skins may be employed. One is to place the lightly steamed nuts into an oven preheated to such a temperature as to cause the moistened skins to embrittle rapidly before having an opportunity to reshape themselves on the nuts in their original snug form. Another method of rapidly drying the nut skins is to mix the nuts with a preheated particulate substance wherein the skins and surfaces of the nuts are rapidly heated without appreciably heating the interior of the nuts.

In the latter case, substantially any particulate material may be used which has high heat capacity, which does not melt or soften within the suggested range of temperatures, and which is useful or innocuous as a constituent of human food. Typical of this class of substances are the chloride, sulphate, and phosphate salts of sodium and the sulphate, phosphate, and carbonate salts of calcium. Substances not desirable for food use, such as insoluble mineral materials or sand may be used, but here it is necessary to remove them completely from the finished product.

The length of time during which the nuts and the particulate substance may successfully remain in contact will vary depending upon the initial temperature of the nuts and particulate substance. For example, for a very hot particulate substance, the time may be very short and if the temperature is not so high, then the time, of course, will be longer. However, the longer times are usually more satisfactory from a practical standpoint since the very short treatments require a relatively high temperature which if maintained even briefly beyond the minimum time will tend to discolor the nuts and to produce other undesirable results. The initial temperature and the time of contact between the nuts and the hot particulate substances is so chosen that the skins are dried and embrittled in the shortest period of time without causing damage to the nut meats.

The ratio by weight of particulate substance to the nuts may vary widely but in view of economic factors, the ratio should be maintained as low as possible. It is found that the minimum practical ratio is about one part of particulate substance to one part of nuts and that the maximum ratio which can be used is generally limited only by economic considerations. The use of a very high ratio involves the handling of unnecessarily large quantities of particulate substance, and it is found that the ratio of two parts of particulate substance to one part of nuts is substantially the optimum ratio for obtaining the best results.

In carrying out this rapid drying and heating process of the skins of the nuts, the nuts are contacted with the hot particulate substance in a revolving cylinder where the particulate substance and nuts are maintained in intimate mixture during a predetermined length of time. When the hot particulate substance and the nuts are so contacted there is a tendency for the mixture temperature to decrease considerably, and, therefore, it is preferable to heat the mixture while it is in the rotating cylinder to maintain the mixture temperature within the desired limits throughout the time interval. This may be accomplished by heating the revolving cylinder.

After the skins of the nuts are heated and dried in the aforementioned manner, the particulate substance is separated from the treated nuts. The separation may be accomplished by screening or vacuum cleaning. After being separated, the particulate substance may then be reheated to the initial temperature and utilized for drying and heating the skins of further nuts. This process of drying and heating the skins may be a continuous process wherein the nuts are contacted with the particulate substance maintained in intimate relation with the particulate substance in the revolving cylinder for desired time interval and thereafter separated from the particulate substance whereby the particulate substance may be reheated and reused in the process.

The foregoing process does not appreciably heat the interior of the nuts but operates primarily for slightly moistening and shrivelling the skins of the nuts and then rapidly heating the skins and surfaces of the nuts. There, therefore, is a temperature differential between the temperature of the skins and the temperature of the nuts to provide a differential heat expansion of the nuts and skins which operates in conjunction with the moistening and shrivelling of the skins to tend to separate the nuts and the skins at the point of intimate contact, such as at the creases referred to above. This slight moistening of the skins and the differential heating effect operate in conjunction with the drying of the skins for loosening the skins from the nuts.

After the nuts are separated from the particulate substance, they are allowed to cool to atmospheric temperature, and since only the skins and surfaces of the nuts are heated by the aforementioned process, the cooling period is, therefore, very short. It is accordingly not necessary to maintain large quantities of nuts in process during the cooling periods, as is necessary in the prior processes for blanching nuts. The cooling of the nuts to atmospheric temperature further embrittles the skins of the nuts so that they may be more readily removed than if they were removed while the skins were hot.

Following the cooling cycle, the nuts with the treated skins are subjected to the action of a mechanical blanching apparatus for removing the skins therefrom. The mechanical blanching apparatus may be of the conventional type wherein the skins are rubbed off the nuts by abrasion. The mechanical removing of the skins in this fashion is greatly facilitated by the skin treating procedure outlined above.

Considering the invention in more detail, the improved process for blanching the nuts may consist of steaming and gently agitating the nuts for a period of substantially two minutes. Steam at atmospheric pressure or at sub-atmospheric pressure or superheated steam may be employed, and it is found that the substantially two minute steaming and agitating period is sufficient to soften or shrivel adequately the skins without appreciably heating or moistening the nut meats. Substantially one part by weight of such mildly steamed nuts are then promptly contacted with substantially two parts by weight of preheated particulate substance in a revolving cylinder. The temperature of the preheated particulate material as it contacts the nuts is about 300° F., and immediately after contact, the mixture temperature becomes substantially 225° F. Heat is applied to the revolving cylinder so that the mixture temperature is raised to substantially 275° F. after a short period of time. The particulate substance and the nuts are maintained in intimate contact in the revolving cylinder at substantially 275° F. for substantially 10 minutes. At the end of this time interval, the skins are thoroughly dried and substantially only the skins and the surfaces of the nuts are heated to this temperature, the interior of the nuts being relatively cool. The nuts are then separated from the particulate substance and allowed to cool to atmospheric temperature by the normal cooling action of the air, and the cooling takes about 30 minutes. After the nuts are thus cooled to atmospheric temperature, the skins thereof are mechanically removed.

It is found that this treatment of the nuts consistently produces 70 to 75% whole blanched nuts, 14 to 17% splits, and 3 to 5% reds, the remainder representing loss in moisture, skins, and small particles of nuts. This represents a considerable improvement over prior methods of blanching nuts wherein the best of such methods produced yields of 60 to 65% whole blanched nuts, 20 to 25% splits, and 5 to 10% reds.

Similar improved results may be obtained with the mild steaming and the rapid drying by contacting the nuts with a particulate substance when the mixture temperature of the nuts and particulate substance falls within the range of 260° F. to 290° F. and when the heat treating period is within the range of from 20 to 5 minutes. It is found that considerably better results are obtained by slightly moistening the skins of the nuts by mild steaming before the nuts are rapidly dried either in a preheated oven or by contact with a preheated particulate substance.

In addition to providing shorter processing periods and easier and more dependable removal of the skins from the nuts, it is found that the moisture content of the nuts is not materially altered, that the flavor is not materially changed, that the nut meats are not browned, that the surfaces of the nuts are not mottled, and that there has been no substantial decrease in the surface luster of the nuts. Since the entire nut is not steamed or heated, less heat units and less time are required to accomplish the blanching operation.

I claim:

1. A process for preparing nuts for blanching consisting of embrittling the skins of the nuts by slightly moistening the skins of the nuts by mildly steaming the skins and surfaces of the nuts from 1 to 3 minutes with steam at substantially 212° F. and then promptly and rapidly drying the moistened skins by rapidly heating the skins and surfaces of the nuts for 5–20 minutes at a temperature between 260° and 290° F.

2. A process for preparing nuts for blanching consisting of embrittling the skins of the nuts by slightly moistening the skins of the nuts and then promptly and rapidly drying the moistened skins by rapidly heating the skins and surfaces of the nuts by contact with a hot particulate substance for 20 to 5 minutes at a mixture temperature between 260° and 290° F.

3. A process for preparing nuts for blanching consisting of embrittling the skins of the nuts by slightly moistening the skins of the nuts by mildly steaming the skins and surfaces of the nuts from 1 to 3 minutes with steam at substantially 212° F. and then promptly and rapidly drying the moistened skins by rapidly heating the skins and surfaces of the nuts by contact with a hot particulate substance for 20 to 5 minutes at a mixture temperature between 260° and 290° F.

4. A process for preparing nuts for blanching consisting of embrittling the skins of the nuts by slightly moistening the skins of the nuts and then promptly and rapidly drying the moistened skins by rapidly heating the skins and surfaces of the nuts by contacting substantially one part by weight of the nuts with substantially two parts by weight of a hot particulate substance for 20 to 5 minutes at a mixture temperature between 260° and 290° F.

5. A process for preparing nuts for blanching consisting of embrittling the skins of the nuts by slightly moistening the skins of the nuts and then promptly and rapidly drying the moistened skins by rapidly heating the skins and surfaces of the nuts by contact with a preheated hot particulate substance and heating the mixture of nuts and particulate substance for 20 to 5 minutes to maintain a mixture temperature between 260° and 290° F.

6. A process for preparing nuts for blanching consisting of embrittling the skins of the nuts by slightly moistening the skins of the nuts and then promptly and rapidly drying the moistened skins by rapidly heating the skins and surfaces of the nuts by contact with a hot salt for 20 to 5 minutes at a mixture temperature between 260° and 290° F.

JOHN STEINER.

REFERENCES CITED

The following references are of record in the file of this patent:

UNITED STATES PATENTS

| Number | Name | Date |
| --- | --- | --- |
| 206,934 | Davis | Aug. 13, 1878 |
| 247,066 | Koerber | Sept. 13, 1881 |
| 493,603 | Sibley | Mar. 14, 1893 |
| 916,448 | Jessup | Mar. 30, 1909 |
| 1,038,032 | Urgelles | Sept. 10, 1912 |
| 1,206,258 | Salomon | Nov. 28, 1916 |
| 1,367,664 | Kennedy | Feb. 8, 1921 |
| 1,448,431 | Castruccio | Mar. 13, 1923 |
| 1,496,411 | Frank | June 3, 1924 |
| 1,664,334 | Thompson et al. | Mar. 27, 1928 |
| 1,850,971 | Rosenfield | Mar. 22, 1932 |
| 2,227,634 | Dalin | Jan. 7, 1941 |

FOREIGN PATENTS

| Number | Country | Date |
| --- | --- | --- |
| 546,149 | Great Britain | Jan. 26, 1942 |